US008720060B2

(12) United States Patent
Headland et al.

(10) Patent No.: US 8,720,060 B2
(45) Date of Patent: May 13, 2014

(54) TRANSITION DUCT

(75) Inventors: Paul Headland, Lincoln (GB); Michael Turnbull, Broughton (GB)

(73) Assignee: Siemens Aktiengesellschaft, München (DE)

( * ) Notice: Subject to any disclaimer, the term of this patent is extended or adjusted under 35 U.S.C. 154(b) by 74 days.

(21) Appl. No.: 13/394,900

(22) PCT Filed: Aug. 10, 2010

(86) PCT No.: PCT/EP2010/061623
§ 371 (c)(1),
(2), (4) Date: Mar. 8, 2012

(87) PCT Pub. No.: WO2011/038970
PCT Pub. Date: Apr. 7, 2011

(65) Prior Publication Data

US 2012/0177487 A1 Jul. 12, 2012

(30) Foreign Application Priority Data

Sep. 30, 2009 (EP) .................................... 09012403

(51) Int. Cl.
*B21K 25/00* (2006.01)
*B23P 15/04* (2006.01)
*F02C 1/00* (2006.01)
*F02G 3/00* (2006.01)

(52) U.S. Cl.
USPC ............................................ 29/889.2; 60/752

(58) Field of Classification Search
USPC .................. 29/889.2; 228/115, 3.1, 135–140; 60/796, 752–760, 39.37
See application file for complete search history.

(56) References Cited

U.S. PATENT DOCUMENTS 3,726,000 A 4/1973 Garri
4,195,474 A * 4/1980 Bintz et al. ....................... 60/730
5,933,699 A * 8/1999 Ritter et al. ........................ 419/6
6,032,361 A * 3/2000 Makino et al. ............... 29/889.2
6,546,627 B1 * 4/2003 Sekihara et al. ............. 29/889.1
7,047,615 B2 5/2006 Norek
7,698,797 B2 * 4/2010 Hetrick et al. .................. 29/505
2004/0020212 A1 * 2/2004 Hirota et al. ..................... 60/752
2006/0185345 A1 8/2006 Wilson et al.
2010/0170259 A1 * 7/2010 Huffman .......................... 60/755
2011/0113785 A1 * 5/2011 Tschuor et al. ................. 60/752
2011/0162378 A1 * 7/2011 Chila et al. ...................... 60/752

FOREIGN PATENT DOCUMENTS

CN 1395664 A 2/2003
CN 1464937 A 12/2003
CN 2760360 Y 2/2006
EP 0816010 A2 1/1998
WO WO 2009103658 A1 8/2009

* cited by examiner

*Primary Examiner* — Gerald L Sung
*Assistant Examiner* — William Breazeal

(57) ABSTRACT

A transition duct is provided for coupling a combustor and a turbine section of a gas turbine. The transition duct includes a transition duct skin. The transition duct skin comprises a first surface section, a second surface section, and a clinch welded joint connecting the first surface section and the second surface section. Also provided is a method for manufacturing such a transition duct.

10 Claims, 7 Drawing Sheets

TRANSITION DUCT

CROSS REFERENCE TO RELATED APPLICATIONS

This application is the US National Stage of International Application No. PCT/EP2010/061623, filed Aug. 10, 2010 and claims the benefit thereof. The International Application claims the benefits of European application No. 09012403.3 EP filed Sep. 30, 2009. All of the applications are incorporated by reference herein in their entirety.

FIELD OF THE INVENTION

The invention relates to transition duct located between a combustor and a turbine section of a gas turbine. Furthermore the invention relates to a gas turbine comprising at least one transition duct and a method for manufacturing a transition duct.

BACKGROUND OF THE INVENTION

Associated with gas turbines having multiple cannular combustors are transition ducts defining fluid passages that carry hot gases from the combustors to the turbine inlet. Typically, the combustors are round, but the turbine inlet is annular. Each transition duct directs the hot gases to a section of the annular turbine inlet. Therefore, the transition duct bodies have round inlets and an exit that forms a segment of an annulus, which may substantially be close to a rectangular shape.

A current design of a transition duct is manufactured via two opposing skins which are pressed into the basic shape and then hand worked. Butt welded joints are applied for the final mating. This is typically a manual and slow process which needs precision hand working. Besides, the used material is stiff and therefore difficult to handle during manufacturing.

U.S. Pat. No. 7,047,615 B2 discloses a method of hydroforming one or more transition duct bodies between two dies in a hydroforming press. This may allow to produce transition duct bodies with no longitudinal welds.

SUMMARY OF THE INVENTION

The present invention seeks to mitigate these drawbacks.

This objective is achieved by the independent claims. The dependent claims describe advantageous developments and modifications of the invention.

In accordance with the invention there is provided a transition duct for coupling a combustor and a turbine section of a gas turbine, comprising a transition duct skin, the transition duct skin comprising a first surface section, a second surface section, and a clinch welded joint connecting the first surface section and the second surface section.

The transition duct is designed for guiding a fluid from the inlet end of the transition duct to its outlet end.

The joint may be formed such that the joint connects the open ends to form a closed loop to guide the fluid without leakage and substantially without turbulence from the inlet end to the outlet end of the transition duct.

The transition duct according to the invention allows a simpler manufacturing of such transition ducts, enhanced automation and less manual work.

In a preferred embodiment the transition duct skin may be formed into a shape forming an inlet end—which may be substantially circular—of the transition duct connectable to the combustor and forming an outlet end—which may be a segment of an annulus which can be considered to be substantially rectangular—of the transition duct connectable to the turbine section.

In a further preferred embodiment the clinch welded joint connecting the first surface section and the second surface section may be a substantially longitudinal connection from the inlet end to the outlet end. “Longitudinal” is meant as parallel to the main flow direction of the fluid, substantially straight, so that only little or no turbulence is applied to the fluid that flows along the clinch welded joint or along an area where the first surface section and the section surface section meet.

In a further embodiment the clinch welded joint may further be defined such as the first surface section may comprise a first perpendicular surface perpendicular—i.e. substantially radially outwards—to an adjacent first part of the transition duct skin, the second surface section may comprise a second perpendicular surface perpendicular to an adjacent second part of the transition duct skin, and the clinch welded joint may join the first perpendicular surface and the second perpendicular surface. The first perpendicular surface and the second perpendicular surface—e.g. arranged as a projection, a flange—may be in substantially flat contact with each other.

This allows that the clinch welded joint itself is not in contact with the fluid through the transition duct. Therefore—and even without grinding or polishing the joint—the surfaces of the transition duct for guiding the fluid can be very smooth so that no turbulence is created by the transition duct skin that is directed to the fluid flow path.

In yet another preferred embodiment the transition duct skin may be of at least one sheet of metal—preferably a single sheet—pressed into a shape forming a single skin transition duct. With “single skin transition duct” it is meant, that only on layer of metal forms the transition duct. If more than one sheet of metal is used, the sheets may be joined by any form of joining process, before or after the pressing into shape takes place.

Alternatively, in a further preferred embodiment, the transition duct skin being of at least one sheet of metal pressed into a shape forming a double skin transition duct. With “double skin transition duct” it is meant, that a first layer of metal forms an inner fluid passage of the transition duct and a second layer of metal forms an outer surface of the transition duct. Preferably there is a gap between the first and the second layer of metal. If more than one sheet of metal is used, the sheets may be joined by any form of joining process, before or after the pressing into shape takes place. The number of sheets of metal may depend on the machines to be used to shape the metal into the required form.

If more than one sheet of metal is used, preferably the transition duct skin may comprise a first one of the at least one sheet, a second one of the at least one sheet, and a butt welded joint connecting the first one of the at least one sheet and the second one of the at least one sheet.

In yet another preferred embodiment, a first edge between the first perpendicular surface and the adjacent first part of the transition duct skin and an opposing second edge between the second perpendicular surface and the adjacent second part of the transition duct skin may be provided. Both the first and the second edge may be arranged such as a recess between the first edge and the second edge provides a substantially turbulence free transition of a fluid during operation of the gas turbine. The first and the second edge may preferably of 90 degree angle.

In accordance with the invention furthermore there is provided a method for manufacturing a transition duct, the transition duct particularly configured according to one of preceding paragraphs, the method comprising the steps of:

forming a transition duct skin, the transition duct skin comprising a first surface section and a second surface section, and clinch welding a clinch welded joint connecting the first surface section and the second surface section.

It has to be noted that embodiments of the invention have been described with reference to different subject matters. In particular, some embodiments have been described with reference to apparatus type claims whereas other embodiments have been described with reference Lo method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying drawings, of which.

The illustration in the drawing is schematical. It is noted that for similar or identical elements in different figures, the same reference signs will be used.

Some of the features and especially the advantages will be explained for an assembled gas turbine, but obviously the features can be applied also to the single components of the gas turbine but may show the advantages only once assembled and during operation. But when explained by means of a gas turbine during operation none of the details should be limited to a gas turbine while in operation.

DETAILED DESCRIPTION OF THE INVENTION

Figure 1:
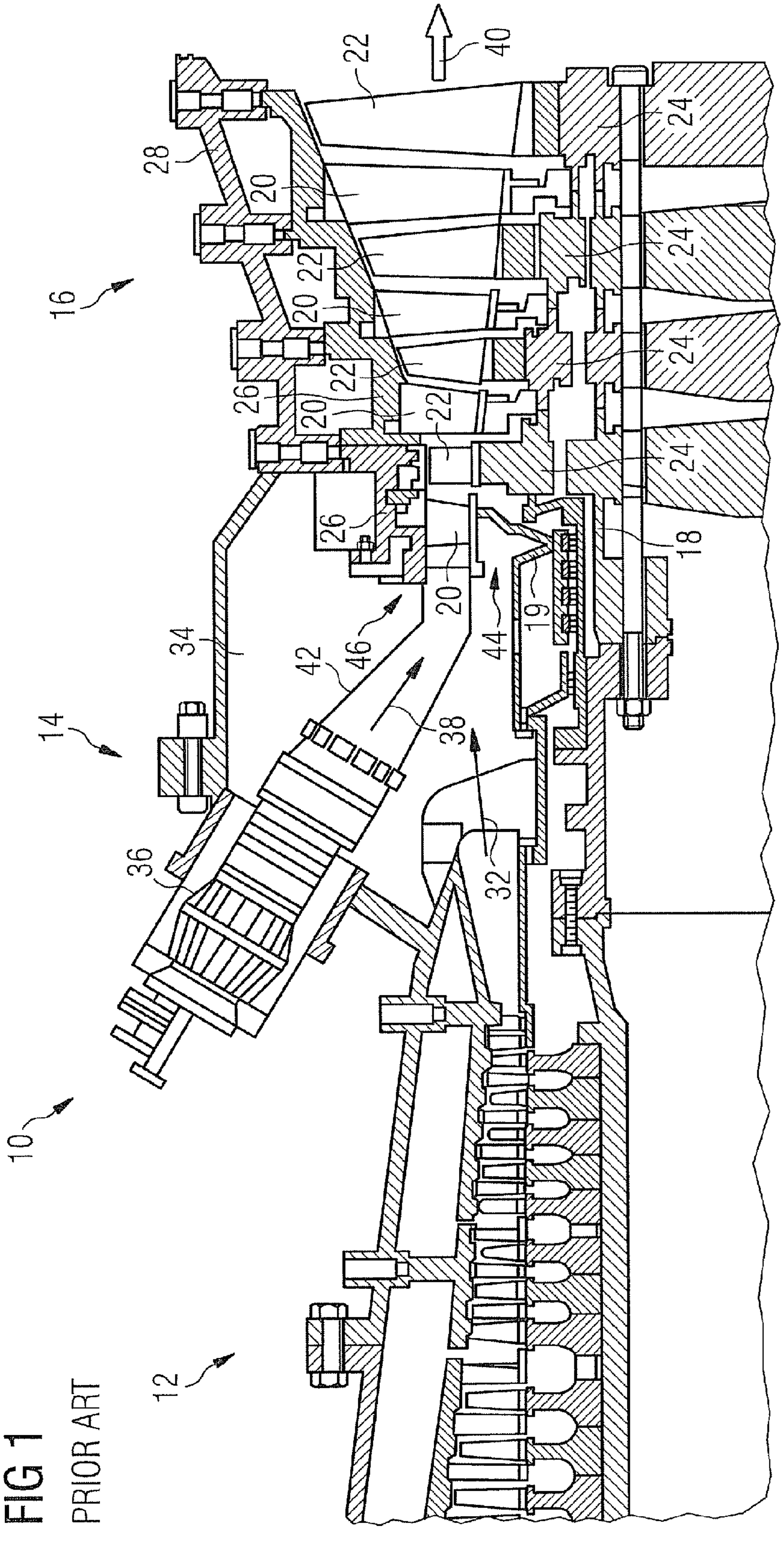
FIG 1 PRIOR ART
FIG. 1: is a cross-sectional view through a portion of a known turbine engine.

Referring to FIG. 1, a gas turbine engine 10 can generally include a compressor section 12, a combustor section 14 and a turbine section 16. A centrally disposed rotor 18 can extend through these three sections. The turbine section 16 can include alternating rows of vanes 20 and rotating blades 22. Each row of blades 22 can include a plurality of airfoils attached to a disc 24 provided on the rotor 18. The rotor 18 can include a plurality of axially-spaced discs 24. The blades 22 can extend radially outward from the discs 24. Each row of vanes 20 can be formed by attaching a plurality of vanes 20 to the stationary support structure in the turbine section 16. For instance, the vanes 20 can be mounted on a vane carrier 26 that is attached to the outer casing 28. The vanes 20 can extend radially inward from the vane carrier 26.

In operation, the compressor section 12 can induct ambient air and can compress it. Compressed air 32 from the compressor section 12 can enter a chamber 34 enclosing the combustor section 12. The compressed air 32 can then be distributed to a plurality of combustors 36 (only one of which is shown). In each of the combustors 36, the compressed air 32 can be mixed with the fuel. The air-fuel mixture can be burned to form a hot working gas 38. The hot gas 38 can be routed to the turbine section 16 by a transition duct 42. As it travels through the rows of vanes 20 and blades 22, the gas 38 can expand and generate power that can drive the rotor 18. The expanded gas 40 can then be exhausted from the turbine 16.

Figure 2:
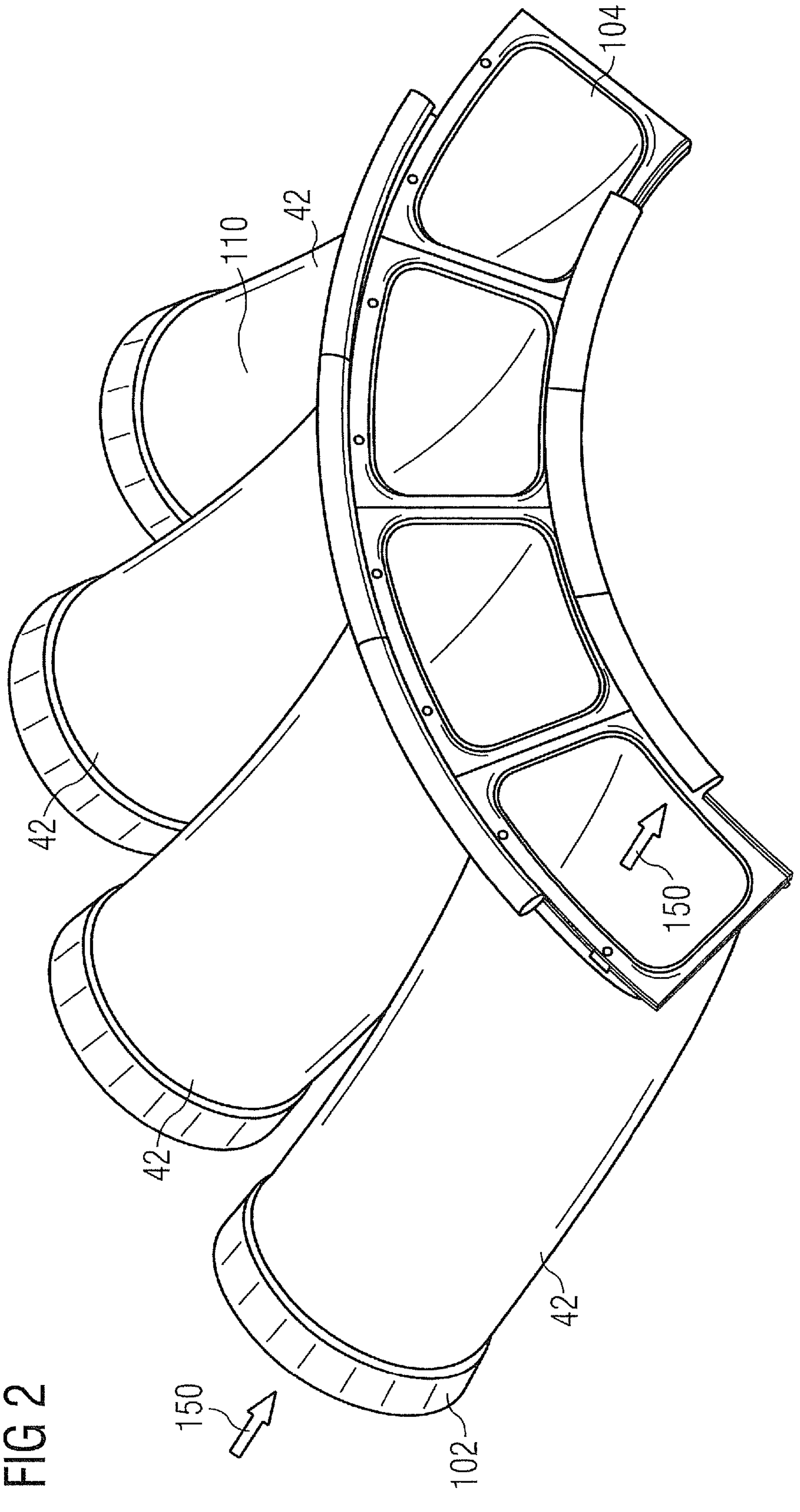
FIG. 2 is a perspective view of a plurality of gas turbine transition ducts.

FIG. 2 shows in more detail a three-dimensional view of a number of transition ducts. Each of the transition ducts 42 comprises a first generally tubular main body 110 having first and second ends 102 and 104. The first end 102 being substantially circular, whereas the second ends 104 being a segment of an annulus and being close to a rectangular shape. The first end 102 is an inlet end of a transition duct 42 which will be connected to a—not shown—outlet of a combustor of a gas turbine. The second end 104 is an outlet end of a transition duct 42 which will be connected to a—not shown—inlet of a turbine section of a gas turbine. The direction of fluid through the transition duct 42 is indicated by the arrow 150. The fluid is guided via the main body 110 as the transition duct skin.

Figure 3A:
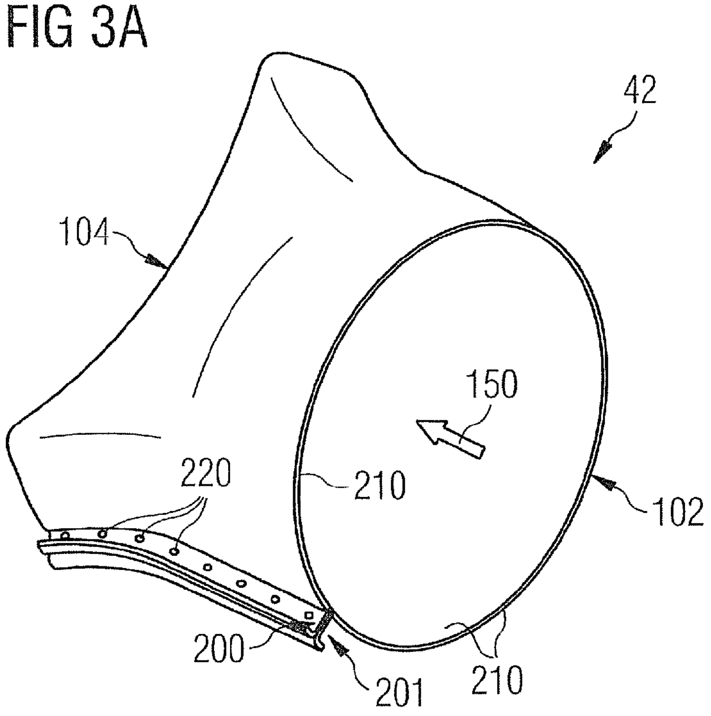
FIG. 3 shows two perspective views on a transition duct according to the invention.
Figure 3B:
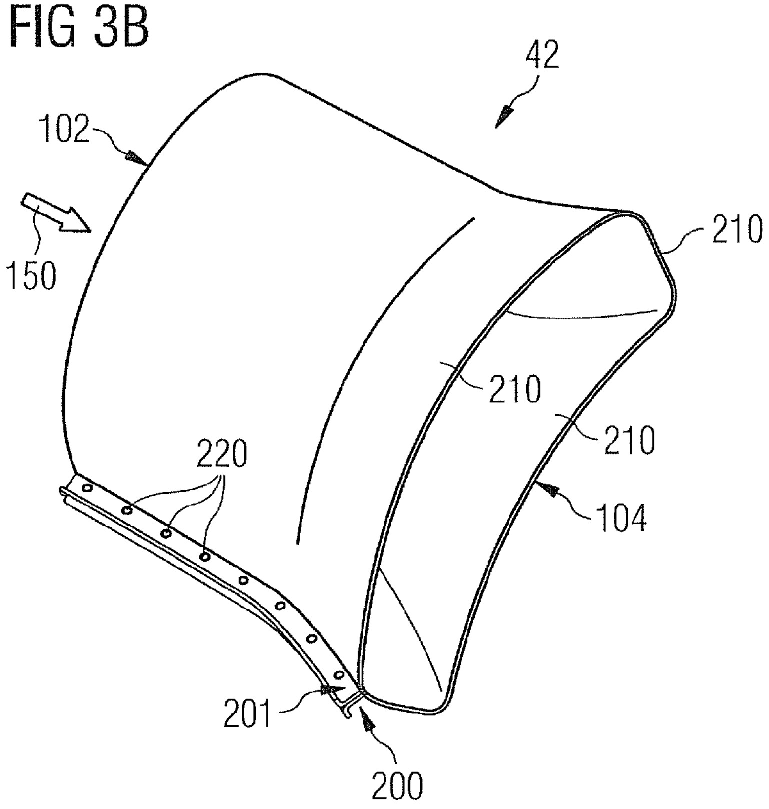

FIGS. 3A and 3B each schematically shows a perspective view of a transition duct 42. Again the first and second ends 102, 104 and the flow direction (arrow 150) are indicated in the figures.

The body of the transition duct 42 is build from a transition duct skin 210, which may be a single sheet of metal which is pressed into a basic shape of the transition duct 42. At the first end of the sheet of metal a flange is formed as a first surface section 200. At the second end of the sheet of metal a further flange is formed as a second surface section 201. Both flanges, i.e. the first and second surface sections 200, 201, are then—during manufacturing—mated together via a clinch welded joint 220.

By "clinch welding" it is meant that the flanges get connected by punching—i.e. clinching—the sheet of metal in the area of the first surface section 200 such that a plurality of sectors from the first surface section 200 get displaced out of their plane and get penetrated into the second surface section 201 so that the first and the second surface sections 200, 201 interlock. Additionally—in parallel or shortly afterwards to the punching step—the first and the second surface sections 200, 201 get integrally connected, e.g. via applying heat or via a cold-upsetting process—the welding step. A sector may preferably be of rectangular shape, but other forms may be advantageous, e.g. triangular or round.

The clinch welded joint 220 preferably is directed outwards of the transition duct 42 so that it does not influence the fluid flow through the transition duct 42. Preferably the clinch welded joint 220 will end at one of the corners of the rectangular like second end 104 of a transition duct 42. With this the fluid flow within the transition duct 42 does not get affected. This effect is supported by having a totally straight clinch welded joint 220 starting from the first end 102 and ending at the second end 104 which always is parallel to the direction of the fluid flow within the transition duct 42. This is considered to be a longitudinal connection between the first surface 200 and second surface 201.

Figure 4A:
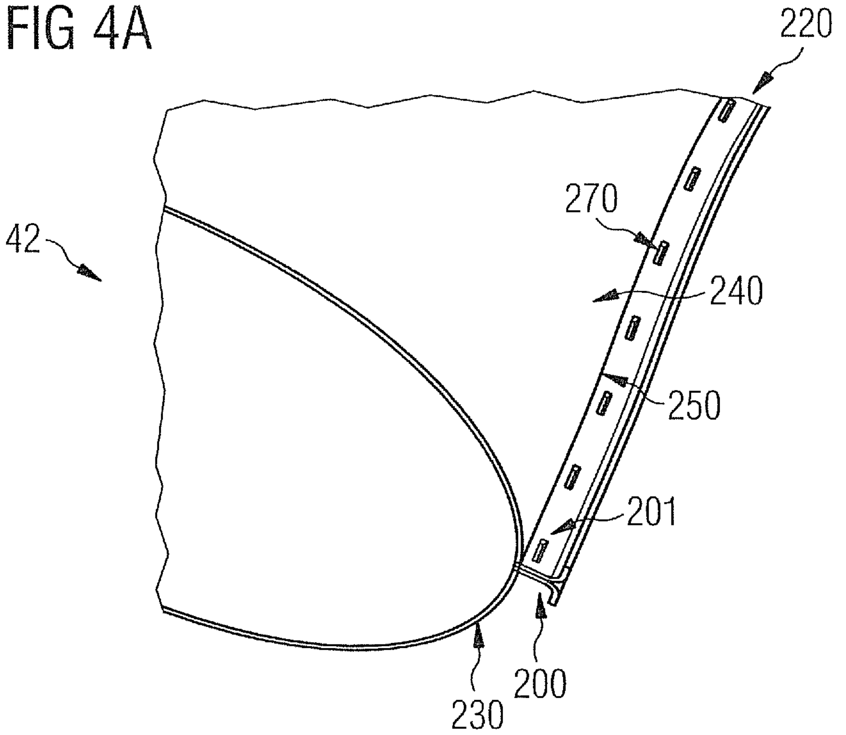
FIG. 4 shows perspective views of a clinch welded joint of a transition duct according to the invention.
Figure 4B:
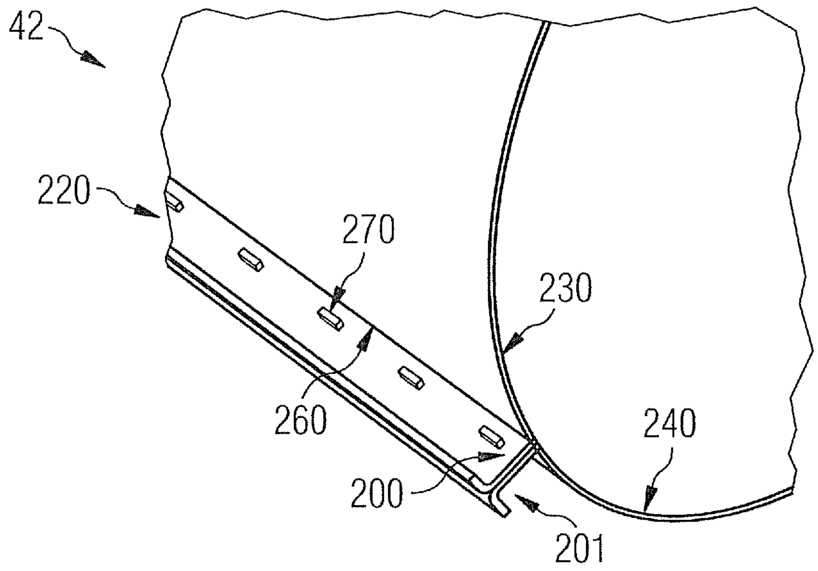
Figure 4C:
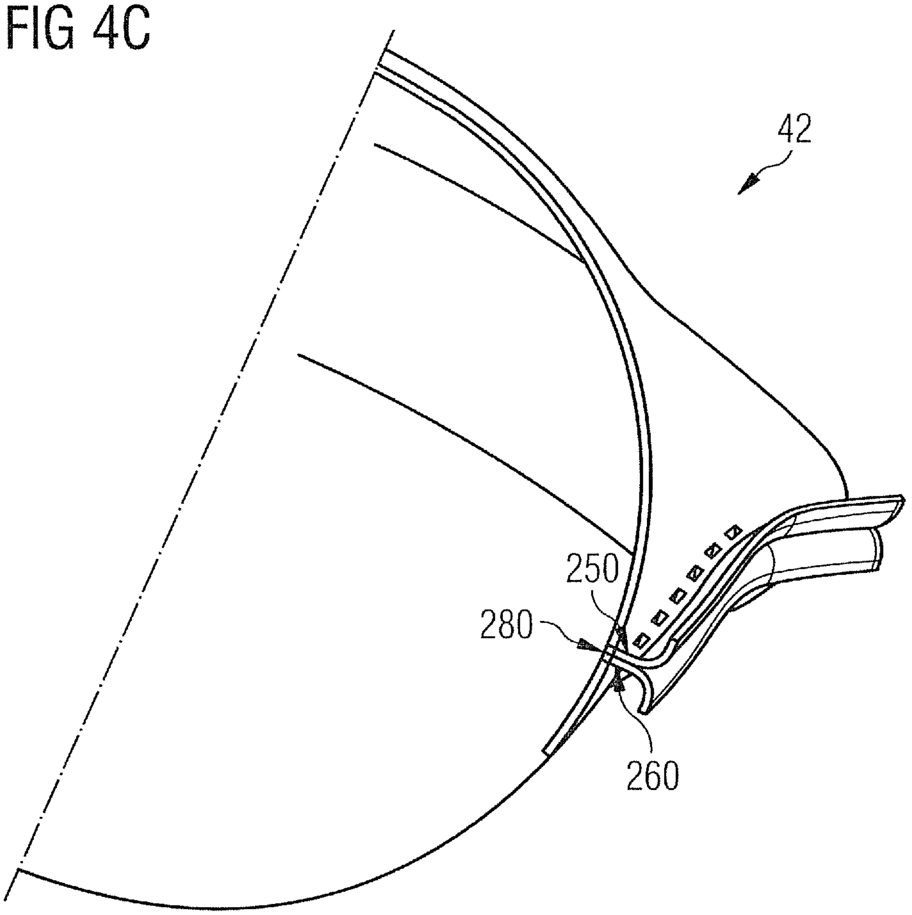

FIGS. 4A, 4B, and 4C schematically show perspective views of a clinch welded joint of a transition duct 42. Only a fraction of the transition duct 42 is depicted, seen from the upstream end of the transition duct 42, i.e. the inlet end or the first end 102. Once the first and the second surface sections 200, 201 are mated, as shown in FIGS. 4A, 4B, and 4C, the clinch welded joint 220 may be perpendicular to an adjacent first part 230 of the transition duct skin and an adjacent second part 240 of the transition duct skin. The clinch welded joint 220 and its adjacent areas further to the end of the sheet of metal may in form of a chamfer and may have a cross section that can be considered to be in form of the shape of a "T" or a "Y" (as can be seen in FIG. 4C).

A first edge 260 between the first surface section 200 and the adjacent first part 230 of the transition duct skin and an opposing second edge 250 between the second surface section 201 and the adjacent second part 240 of the transition duct skin may be both of a 90 degree angle. Additionally both edges 250, 260 being may be arranged such as a recess between the first edge 260 and the second edge 250 provides a substantially turbulence free transition of a fluid during operation of the gas turbine through the transition duct 42. This is shown in the FIGS. 4A and 4B, and specifically in FIG. 4C, by showing a totally smooth and round inner surface of the transition duct 42, even in the area of the first and second edges 260, 250. No gap or step is present at the area of the clinch welded joint 220 on the inside of the transition duct skin (this area is marked as 280 in FIG. 4C).

In FIGS. 4A and 4B clinched sectors 270 are shown as rectangles. In FIG. 4A a depression of the sectors 270 into the second surface section 201 can be seen, and in FIG. 4B an elevation from the first surface section 200.

In all the previous embodiments a single skin transition duct was shown, possibly formed from a single sheet of metal. Once brought into shape, one surface of the single sheet of metal is directed to the inside of the transition duct being in contact with the hot combustion fluid through the transition duct during operation, whereas the opposite surface of the single sheet of metal is directed to the outside of the transition duct without being in contact with the hot combustion fluid. Possibly cooling air is directed to the outside surface of the transition duct, if necessary.

In the following, further embodiments directed to a double skin transition duct will be explained. With double skin a configuration is meant in which one sheet of metal defines the inner surface of the transition duct and a second sheet of metal—or the same sheet of metal but brought into shape into that position—defines the outer surface of the transition duct. The surfaces are spaced-apart with a small gap or channel in between the surfaces, possibly with some connections between the surfaces for stabilisation. A double skin configuration may be advantageous in respect of stability, weight, cooling, acoustic damping, etc.

Figure 5A:
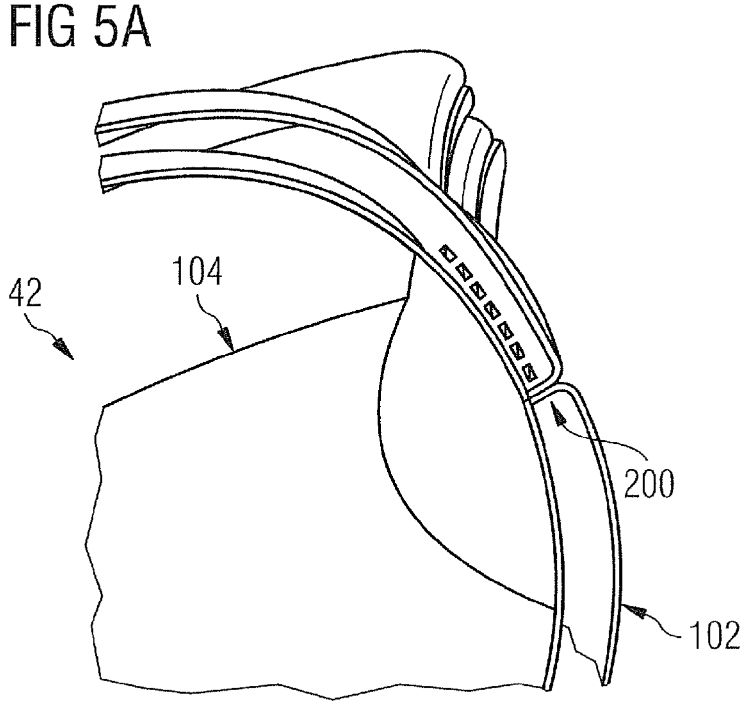
FIG. 5 shows perspective views of a clinch welded joint of a double skin transition duct according to the invention.
Figure 5B:
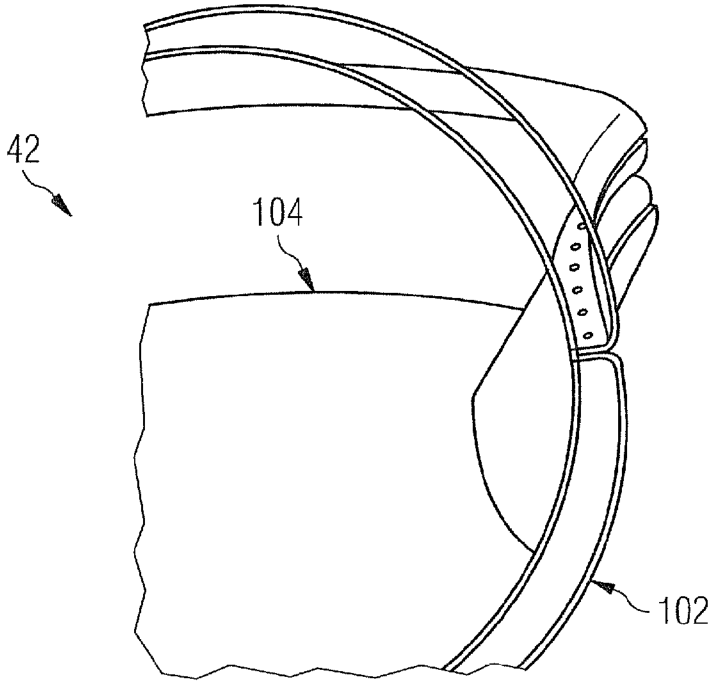
Figure 5C:
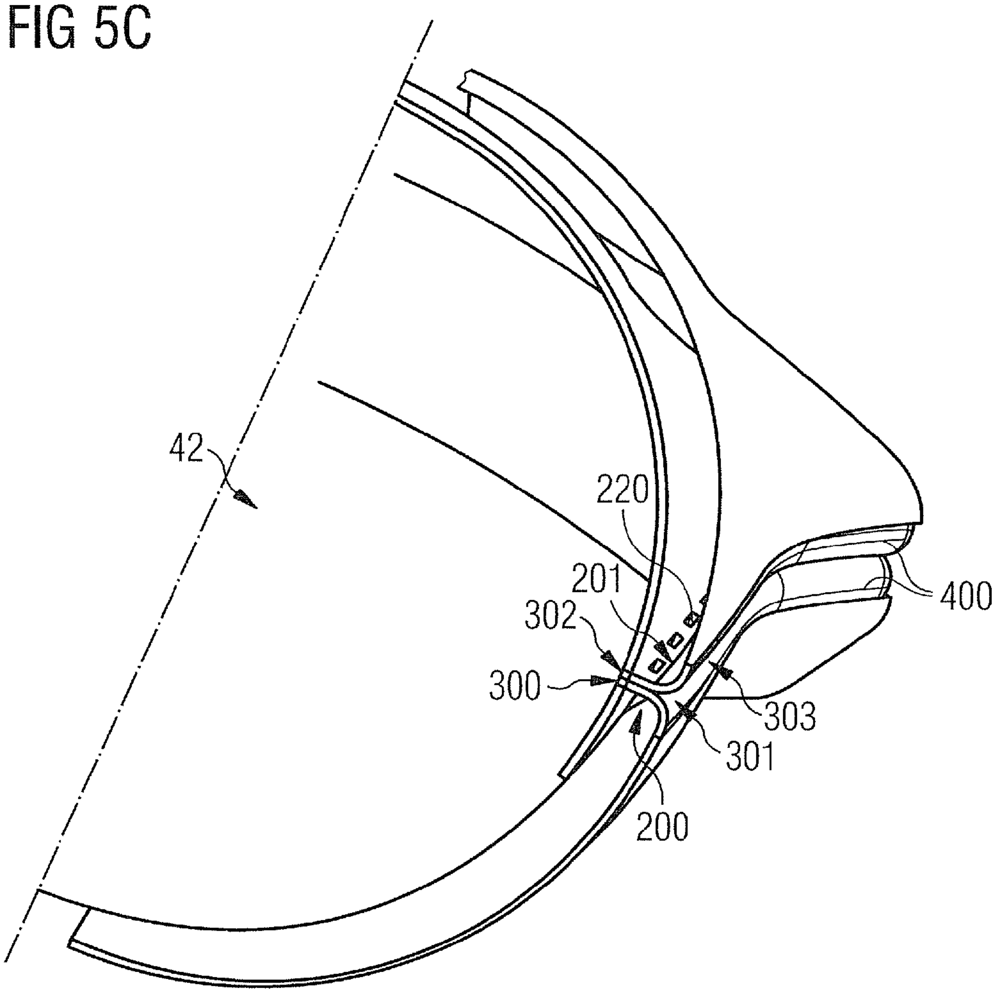

In FIGS. 5A, 5B, and 5C schematically perspective views of a clinch welded joint of a double skin transition duct 42 are shown. Only a fraction of the transition duct 42 is depicted, seen from the upstream end of the transition duct 42, i.e. the inlet end or the first end 102.

Generally FIGS. 5A, 5B, 5C can be defined as that a clinch welded joint will be used to attach the inner skins together and a butt weld is used to attach the outer skins of the transition duct 42.

The first surface section 200 is an area of the sheet of metal between a first rim 300 as a first edge and a second rim 301. Each of the rims 300 and 301 flap the sheet of metal substantially 90 degree so that two adjacent parts of the sheet of metal adjacent to the first surface section 200 are substantially parallel planes. In FIG. 5C rim 300 is facing to the inside of the transition duct 42 and being substantially a sharp right-angled ledge. In FIG. 5C rim 301 is facing to the outside of the transition duct 42 and being substantially a section of a cylinder.

In between the first 300 and the second rim 301 the first surface section 200 is built as a flat surface which is clinch welded via a clinch welded joint 220 with the opposing second surface section 201. The opposing second surface section 201 is framed similar to the first surface section 200 by a rim 302 as a first edge directed radially inwards and a second rim 303 directed radially outwards of the transition duct.

Both the first surface section 200 and the opposing second surface section 201 are in flat contact with each other between the mentioned rims and are gapless so that no fluid streaming through the transition duct 42 during operation may leave via the mated line between rims 300 and 302.

The transition duct skin may be of at least two sheets of metal. A first sheet of metal may be used to build the inner surface of the transition duct 42, the first surface section 200, and a short piece of the outside surface of the transition duct 42. Then a second sheet of metal will be formed for the outside of the double skin transition duct 42 and will be connected to the previously mentioned short piece end of the first surface. This connection may be done via butt welding as a butt welded joint 400.

With this configuration with two sheets of metal a complete double skin transition duct 42 can be built, by clinch welding the first sheet of metal to create a closed loop of sheet metal as the inner body of the transition duct 42 and by butt welding the two ends of the first sheet of metal with the second sheet of metal and therefore building a second closed surface of the transition duct 42.

Independently whether the transition duct 42 is built with single or double skinned, it may have only one single clinch welded joint, but possibly, if assembled from a plurality of sheets of metal, also of two or a plurality of clinch welded joints. For example the transition duct 42 may be axially symmetric or point symmetric resulting in two clinch welding joints at opposing sides of the transition duct 42 or may be composed out of several segments which are clinch welded together resulting in a plurality clinch welding joints at different circumferential positions of the transition duct 42.

Besides the mentioned transition duct 42 the invention is also directed to a method for manufacturing such a transition duct 42. The method may comprise the steps of: Firstly, providing at least one sheet of metal. Secondly, forming a transition duct skin 210 from the sheet of metal, the transition duct skin 210 comprising a first surface section 200 and a second surface section 201. Advantageously the first surface section 200 and a second surface section 201 may be formed perpendicularly in relation to adjacent parts of the sheet of metal. Thirdly, clinch welding a clinch welded joint 220 connecting the first surface section 200 and the second surface section 201. If necessary, fourthly, butt welding open ends of the sheet of metal so that a closed wall—single or double skinned—of the transition duct 42 gets build.

With the mentioned new manufacturing method and the new transition duct, manufacturing time can be improved and simplified.

The invention claimed is:

1. A transition duct for coupling a combustor and a turbine section of a gas turbine, the transition duct comprising:

a transition duct skin, the transition duct skin comprising a first surface section, a second surface section, and a clinch welded joint connecting the first surface section and the second surface section, wherein the first surface section comprises a first perpendicular surface perpendicular to an adjacent first part of the transition duct skin, and the second surface section comprises a second perpendicular surface perpendicular to an adjacent second part of the transition duct skin, and the clinch welded joint joining the first perpendicular surface and the second perpendicular surface, the first perpendicular surface and the second perpendicular surface being in substantially flat contact with each other, wherein the adjacent first part of the transition duct skin and the adjacent second part of the transition duct skin each form a part of the inner surface of the transition duct skin.

2. The transition duct according to claim 1, wherein the transition duct skin is formed into a shape forming an inlet end of the transition duct connectable to the combustor and forming an outlet end of the transition duct connectable to the turbine section.

3. The transition duct according to claim 2, wherein the clinch welded joint connecting the first surface section and the second surface section being a substantially longitudinal connection from the inlet end to the outlet end.

4. The transition duct according to claim 1, wherein the transition duct skin comprises at least one sheet pressed into a shape forming a single skin transition duct.

5. The transition duct according to claim 4, wherein the transition duct skin comprises a first one of the at least one sheet, a second one of the at least one sheet, and a butt welded joint connecting the first one of the at least one sheet and the second one of the at least one sheet.

6. The transition duct according to claim 1, wherein the transition duct skin comprises at least one sheet pressed into a shape forming a double skin transition duct.

7. The transition duct according to claim 6, wherein the transition duct skin comprises a first one of the at least one sheet, a second one of the at least one sheet, and a butt welded joint connecting the first one of the at least one sheet and the second one of the at least one sheet.

8. The transition duct according to claim 1, wherein a first edge between the first perpendicular surface and the adjacent first part of the transition duct skin and an opposing second edge between the second perpendicular surface and the adjacent second part of the transition duct skin both being arranged such as a recess between the first edge and the second edge provides a substantially turbulence free transition of a fluid during operation of the gas turbine.

9. A Gas turbine comprising at least one transition duct according to claim 1.

10. A method for manufacturing a transition duct, comprising:

forming a transition duct skin, the transition duct skin comprising a first surface section and a second surface section, and clinch welding a clinch welded joint connecting the first surface section and the second surface section, wherein the first surface section comprises a first perpendicular surface perpendicular to an adjacent first part of the transition duct skin, and the second surface section comprises a second perpendicular surface perpendicular to an adjacent second part of the transition duct skin, wherein the clinch welding performed such that the clinch welded joint joins the first perpendicular surface and the second perpendicular surface, the first perpendicular surface and the second perpendicular surface being in substantially flat contact with each other, wherein the adjacent first part of the transition duct skin and the adjacent second part of the transition duct skin each form a part of the inner surface of the transition duct skin.

* * * * *